(12) United States Patent  (10) Patent No.: US 7,085,533 B1
Rubinstein et al.  (45) Date of Patent: Aug. 1, 2006

(54) NETWORK WIRELESS ACCESS INTELLIGENT CONCENTRATOR SYSTEM AND METHOD

(75) Inventors: Alan Rubinstein, Fremont, CA (US); Gary Wang, Cupertino, CA (US)

(73) Assignee: 3Com Corporation, Marlborough, MA (US)

( * ) Notice: Subject to any disclaimer, the term of this patent is extended or adjusted under 35 U.S.C. 154(b) by 479 days.

(21) Appl. No.: 10/082,489

(22) Filed: Feb. 22, 2002

Related U.S. Application Data

(60) Provisional application No. 60/301,532, filed on Jun. 26, 2001, provisional application No. 60/285,419, filed on Apr. 20, 2001, provisional application No. 60/277,592, filed on Mar. 20, 2001, provisional application No. 60/277,451, filed on Mar. 20, 2001, provisional application No. 60/277,767, filed on Mar. 20, 2001, provisional application No. 60/277,593, filed on Mar. 20, 2001.

(51) Int. Cl.
*H04B 7/00* (2006.01)
(52) U.S. Cl. ............... 455/41.2; 370/338; 370/401; 370/419
(58) Field of Classification Search ............ 455/403, 455/426.1, 426.2, 41.2, 41.3; 370/338, 400–403, 370/419–421
See application file for complete search history.

(56) References Cited

U.S. PATENT DOCUMENTS

| 5,754,539 A | * | 5/1998 | Metz et al. ............... 370/349 |
| 6,571,221 B1 | * | 5/2003 | Stewart et al. ............ 705/52 |
| 6,877,104 B1 | * | 4/2005 | Shimono ................... 714/4 |

* cited by examiner

*Primary Examiner*—Lee Nguyen

(57) ABSTRACT

The present invention is a flexible wireless communication network connection point that provides convenient and effective connection of network devices to a network. In one embodiment the present invention is a multi-configuration network connection point device comprising a first connection interface, a second connection interface, a means for intelligently concentrating data and a communication bus. The first connection interface includes a primary connection port for communicatively coupling to an upstream network device. The second connection interface including a secondary connection port for communicatively coupling to a downstream network device via a wireless technology. In one exemplary implementation the second connection interface is adapted to be secured in a fixed location while conveniently providing the communicative coupling to a downstream network device via a wireless technology. The means for intelligently concentrating data concentrates data from a plurality of interface connection ports included in the second connection interface for communication on the primary connection port of the first connection interface. The communication bus communicatively couples the first connection interface to the second connection interface.

16 Claims, 7 Drawing Sheets

500

Providing a single connection point on a primary communication interface.
510

Providing a plurality connection point on a primary communication interface.
520

Coupling the single connection point on the primary communication interface to the plurality of connection points on the secondary communication interface.
530

NETWORK WIRELESS ACCESS INTELLIGENT CONCENTRATOR SYSTEM AND METHOD

RELATED U.S. APPLICATIONS

This application claims priority to the copending provisional patent applications: patent application Ser. No. 60/277,593, entitled "'Intellijack' physical concepts," with filing date Mar. 20, 2001, and assigned to the assignee of the present invention; patent application Ser. No. 60/277,767, entitled "A method for managing intelligent hardware for access to voice and data networks," with filing date Mar. 20, 2001, and assigned to the assignee of the present invention; patent application Ser. No. 60/277,451, entitled "A method for filtering access to voice and data networks by use of intelligent hardware," with filing date Mar. 20, 2001, and assigned to the assignee of the present invention; patent application Ser. No. 60/277,592, "'Intellijack' usage," with filing date Mar. 20, 2001, and assigned to the assignee of the present invention; patent application Ser. No. 60/285,419, "Intelligent concentrator," with filing date Apr. 20, 2001, and assigned to the assignee of the present invention; and patent application Ser. No. 60/301,532, "Intelligent concentrator," with filing date Jun. 26, 2001, and assigned to the assignee of the present invention.

BACKGROUND OF THE INVENTION

1. Field of the Invention

This invention relates to the field of communication networks. In particular, the present invention relates to a system and method for providing concentrated access to a communication network by wireless devices.

2. Related Art

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity in analyzing and communicating data, ideas and trends in most areas of business, science, education and entertainment. Often these advantageous results are realized and maximized through the use of distributed resources. Utilizing distributed resources usually involves numerous devices relying on various communication mediums to communicate with each other. However, providing convenient communication network connections capable of accommodating a variety of communication devices is often expensive and very difficult.

Communication technologies are advancing at an incredible rate in significantly different directions due to the advantages provided by different configurations and implementations. Networks can be arranged in numerous configurations comprising a variety of network types. Some of the most popular types of networks comprise Ethernet (coaxial cable or twisted-pair cable), token ring, Fiber Distributed Data Interface (FDDI), Frame Relay, Integrated Services Digital Network (ISDN), X.25, and Synchronous Data Link Control (SDLC). Different communication protocols usually have different advantages. The different advantageous characteristics of communication protocols or configurations often tend to be somewhat mutually exclusive and the utilization of a particular communication architecture usually results in a trade off of benefits. Hardwire communication networks and wireless communication networks are one example of two protocols that tend to have mutually exclusive characteristics such as inversely proportional bandwidth and portability attributes.

Hardwired networks typically provide significant bandwidth and are better equipped to satisfy significant communication requirements associated with advanced and complicated end use applications. However, hardwire communication networks involve the installation of significant infrastructure resources that are relatively expensive to install and maintain. For example, traditional communication networks such as a local area network (LAN) typically have multiple parallel cable or communication bus runs to end use devices at each worksite. The parallel runs are a significant portion of the resources and costs associated with installation of a network, the more parallel runs the greater expenditure or resources. Hardwired devices also typically require a connection to a central power supply (such as utility power) and the power is usually delivered by separate cable runs. The portability of the end use devices in a hardwired system is usually hindered and limited by the "tethered" connection to a network.

Wireless communications technologies tend to offer a number of benefits not readily available in hardwired systems. For example, wireless communication devices usually provided ease of use and greater mobility. However, wireless devices tend to have characteristics that are limited with regard to certain desirable features. For example, wireless communication devices tend have relatively limited bandwidth compared to hardwired communication systems. The operation of wireless devices also tends to be limited by the amount of the power available (e.g., batteries) in the portable device. The reliability of wireless communications are also generally susceptible to adverse impacts due to affects such as loss or deterioration of signal due to noise, interference, distance, etc., and are more susceptible to security infiltration and illicit activities.

Many of the adverse affects encountered in a communications network are related to the manner in which devices are "connected to" the communication network. Typically, communications protocols between major communication network facilities (such as a plurality of head end host devices or central switching centers) have characteristics that lend themselves to fixed unchanging connection mechanisms that are resource extensive and undesirable (e.g., overkill) for most downstream end use connections. However, it is usually desirable for downstream connections to be flexibly capable of accommodating a wide variety of differently configured end use devices. Downstream end use connections to a communication network are often initially made at a local area network (LAN) with different downstream end use devices (such as a group of personal computers (PC), printers, faxes, etc.) located in a home or single business site (location). Traditional attempts at accommodating initial connections to a communications network are usually ad hoc, of questionable reliability, resource intensive (such as separate communication paths and connections to upstream facilities for each connection), inefficiently managed and subject to failures (e.g., caused by accidental breakage or removal of a wire).

There are a number of other desirable communication network features that are often critically impacted by a communication network connection point. For example, maintenance troubleshooting and fault detection are usually complicated and resource intensive activities. Traditional technologies sometimes rely upon separate stand alone connection points (such as connection points in unanchored boxes) that are susceptible to movement, attempted tampering or accidental damage (such as coffee spills, getting knocked over, hit, jarred, etc.) by ordinary end users that do not have the requisite knowledge or skill to participate in network facility administration activities. Some traditional attempts at correcting communication problems are directed to connections dedicated on a per user or end use device basis and these very "rigid" approaches tend to remove a desirable level of end user connection flexibility. While the flexibility of users being able to easily move end use devices to different locations or connect different devices to a connection point is advantageous and convenient, the potential movement of the stand alone connection points by end users rather than network maintenance personnel is not desirable since it tends to introduce additional variables to a troubleshooting process.

Traditional end use connection points are also often vulnerable to security breaches. Some traditional security approaches rely upon software security solutions but these usually require constant maintenance and management and are subject to attacks through common hacking techniques. For example, stand alone connection points are susceptible to illicit interaction behind a firewall. An additional weakness of traditional software solutions is that the end use device to be networked may not be able to host requisite software. Wireless communications are particularly vulnerable to illicit interception. Wireless communications are usually broadcast over long distances covering publicly accessible spaces making interception relatively easy.

Accordingly, what is required is a flexible communications network connection point that provides convenient and effective connection of network devices to a network.

SUMMARY OF THE INVENTION

The present invention is a flexible wireless communication network connection point that provides convenient and effective connection of network devices to a network. In one embodiment the present invention is a multi-configuration network connection point device comprising a first connection interface, a second connection interface, a means for intelligently concentrating data and a communication bus. The first connection interface includes a primary connection port for communicatively coupling to an upstream network device. The second connection interface including a secondary connection port for communicatively coupling to a downstream network device via a wireless technology. In one exemplary implementation the second connection interface is adapted to be secured in a fixed location while conveniently providing the communicative coupling to a downstream network device via a wireless technology. The means for intelligently concentrating data concentrates data from a plurality of interface connection ports included in the second connection interface for communication on the primary connection port of the first connection interface. The communication bus communicatively couples the first connection interface to the second connection interface.

DETAILED DESCRIPTION OF THE INVENTION

Figure 1A:
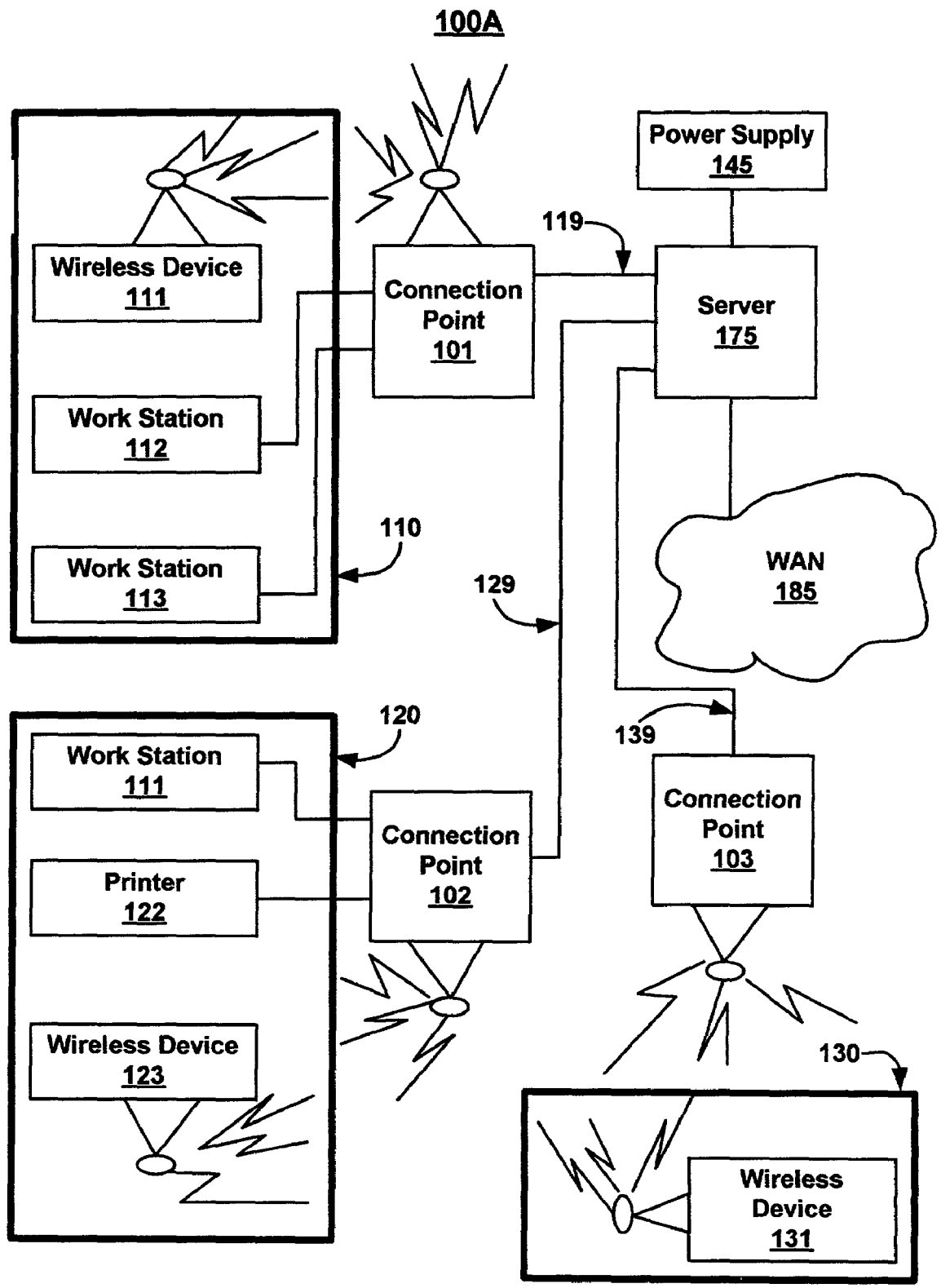
FIG. 1A is a block diagram of a LAN with one embodiment of a present invention multi-configuration network connection point device.

Reference will now be made in detail to the preferred embodiments of the invention, a network access intelligent concentrator device and method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "translating" or "calculating" or "determining" or "scrolling" or "displaying" or "recognizing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

FIG. 1 is a block diagram of LAN 100A with one embodiment of a present invention multi-configuration network connection point device. LAN 100A comprises a server 175, work groups 110, 120 and 130 and multi-configuration network connection point devices 101, 102, and 103. The plurality of work groups 110, 120 and 130 are communicatively coupled to the LAN by multi-configuration network connection point devices 101, 102, and 103, respectively. Multi-configuration network connection point devices 101, 102, and 103 each include a primary connection interface with a single communication port and a secondary connection interface with a plurality of communication ports. Multi-configuration network connection point devices 101, 102, and 103 are communicatively coupled to upstream communication devices (e.g., server 175) by single communication paths 119, 129 and 139 respectively. Work groups coupled to LAN 100A can take a variety of configurations and components included in the work groups can perform a variety of functions. For example, work group 110 comprises wireless device 111, work station 112 (e.g., a personal computer) work station 113, work group 120 comprises a work station 121, peripheral device 122 (e.g., a printer), and wireless device 123; and work group 130 comprises wireless device 131 (e.g., a telephone, personal computer, laptop, personal digital assistant, etc.) LAN 100A is coupled to WAN 185 and power supply 145.

Each of the devices included in LAN 100A requires a communication network connection point to communicate with other devices coupled to LAN 100A. Multi-configuration network connection point devices 101, 102, and 103 provide a convenient efficient communication network connection point for the end use devices (e.g., between devices within the same work group, between devices in different work groups, between end use devices and upstream devices, etc). The multi-configuration network connection point devices are readily adaptable for providing a network connection point for a variety of devices utilizing different communication protocols and the primary connection interface single port does not require separate parallel cable runs to couple with upstream devices. In one embodiment of the present invention, multi-configuration network connection point devices 101, 102, and 103 are configured for anchored placement in fixed locations (e.g., recessed in a wall or office cubicle section) in a manner that facilitates maintenance of system integrity and security.

Figure 1B:
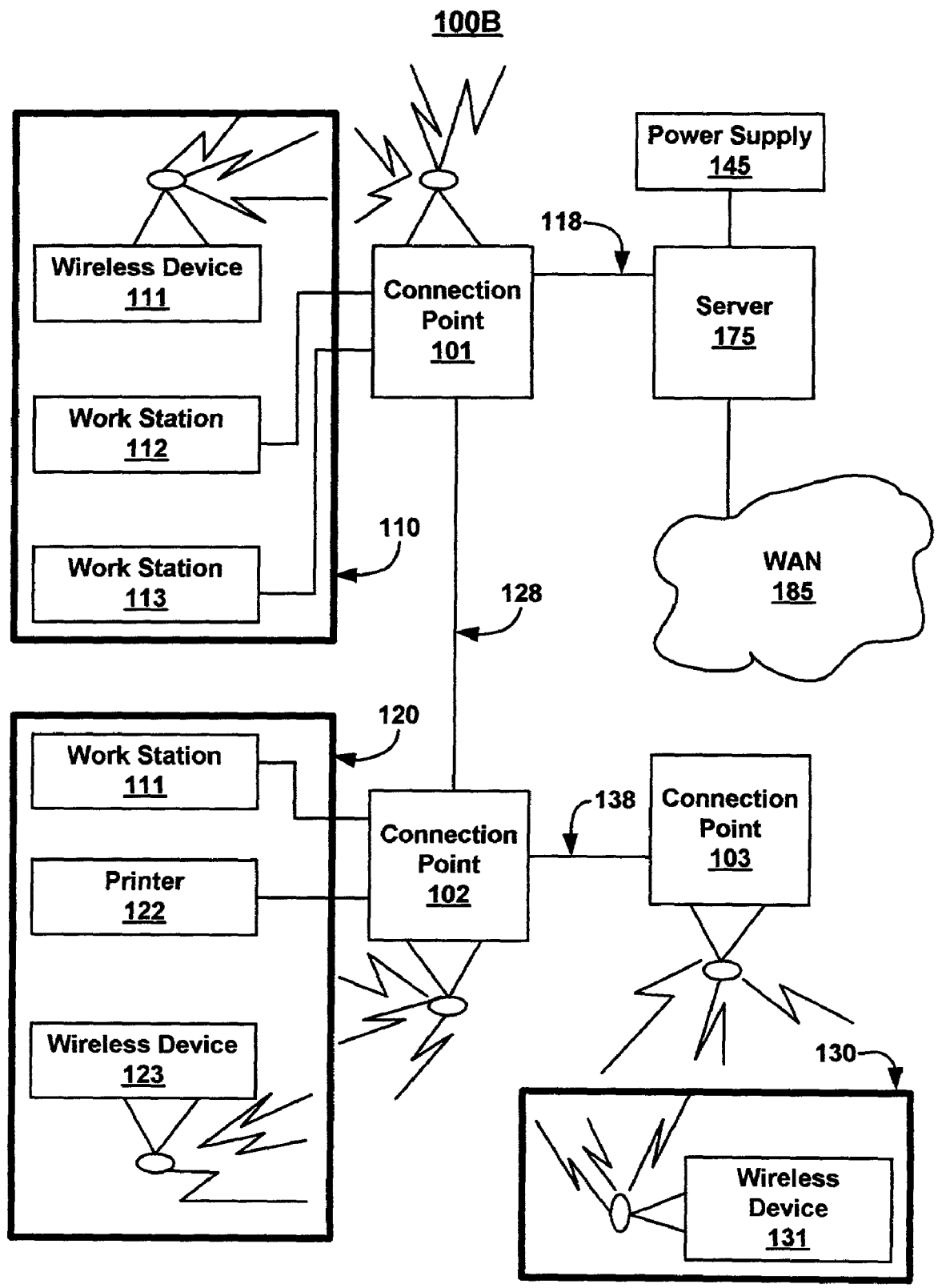
FIG. 1B is a block diagram of another LAN, one exemplary implementation of the present invention in which multi-configuration network connection point devices are coupled to each other.

FIG. 1B is a block diagram of LAN 100B, one exemplary implementation of the present invention in which multi-configuration network connection point devices are coupled to each other. LAN 100B is similar to LAN 100A except multi-configuration network connection point devices 101, 102, and 103 are communicatively coupled to upstream communication devices by serial communication paths 118, 128 and 138 respectively (e.g., in a daisy chain fashion). Communications from downstream multi-configuration network connection point devices are passed through to upstream devices.

In one embodiment of the present invention, network connection point devices 101, 102 and 103 facilitate wireless communication to end use devices. In one exemplary implementation network connection point devices 101, 102 and 103 provide an interface for wireless communications to downstream devices and hardwired communications to upstream devices. In one embodiment of the present invention, network connection point devices 101, 102 and 103 are capable of "seamlessly" handing off of communication connections as an end use device moves between work groups. In one exemplary implementation, wireless device 123 initiates a communication with server 175 via multi-configuration network connection point devices 102 and seamlessly continue the communication via multi-configuration network connection point devices 103 (e.g., as wireless device 123 is moved from work group 102 area to work group 103 area).

Figure 2A:
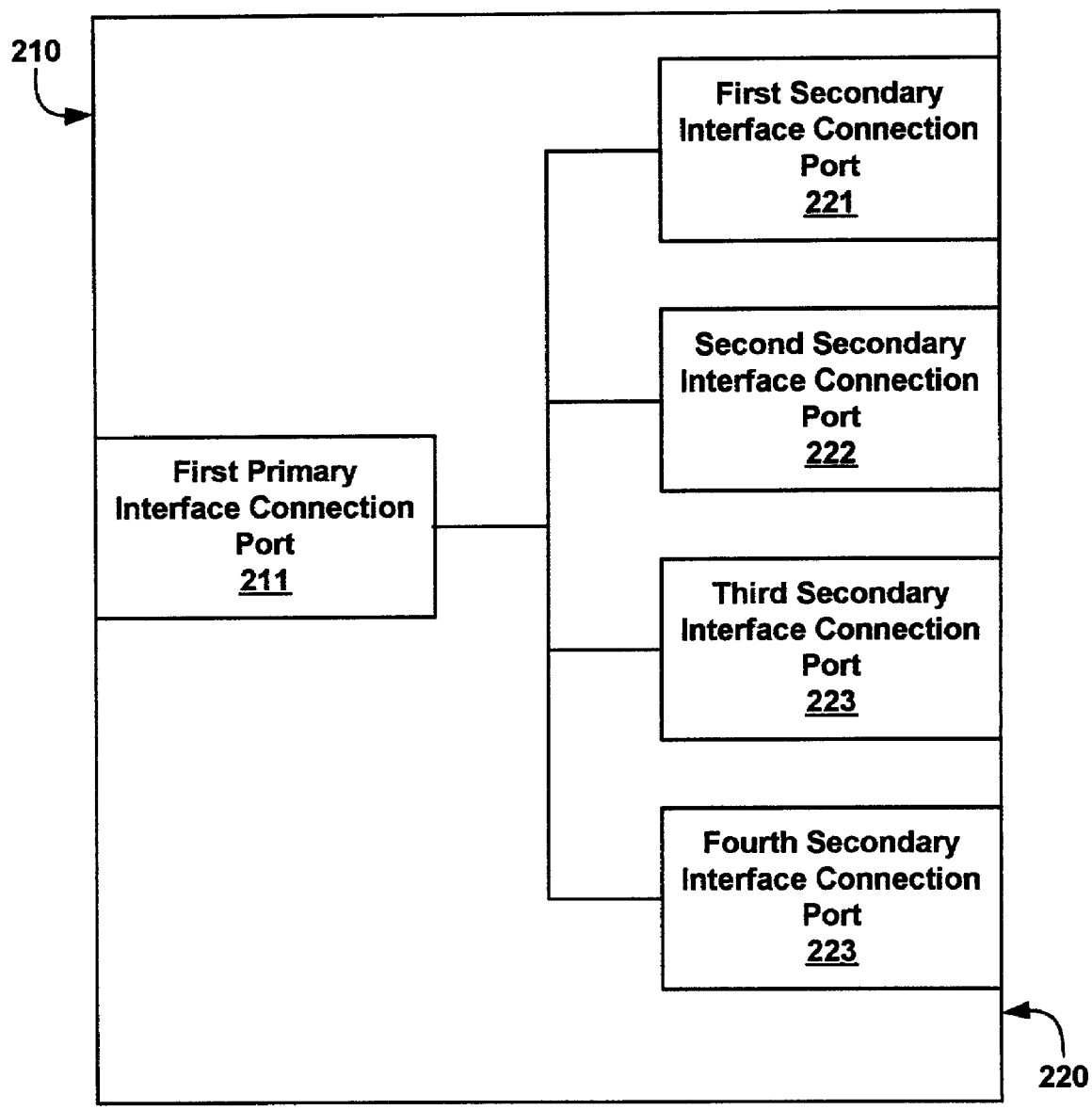
FIG. 2A is a block diagram of multi-configuration network connection point device, one embodiment of the present invention.

FIG. 2A is a block diagram of multi-configuration network connection point device 200A, one embodiment of the present invention. Multi-configuration network connection point device 200A comprises a primary connection interface 210 and a secondary connection interface 220. In one embodiment of the present invention, primary connection interface 210 is communicatively coupled to upstream network devices and secondary connection interface 220 is communicatively coupled to downstream network devices. In one embodiment of the present invention, primary connection interface 210 comprises primary connection interface port 211. In one embodiment of the present invention, secondary connection interface 220 comprises a first secondary connection interface port 221, a second secondary connection interface port 222, a third secondary connection interface port 223, and a fourth secondary connection interface port 224. Multi-configuration network connection point device 200A is readily adaptable for anchored placement in fixed locations (e.g., recessed in a wall or office cubicle partition).

The components of multi-configuration network connection point device 200A cooperatively operate to communicatively couple devices via the primary connection interface and the secondary connection interface. In one embodiment of the present invention, the secondary connection interface utilizes wireless technology to communicate with end use devices. In one exemplary implementation of the present invention, a secondary connection interface port (e.g., 221) includes a wireless communication component for facilitating wireless communications. The wireless communication component includes an antenna for propagating electromagnetic communication signals, a transmitter for transmitting the electromagnetic signals and a receiver for receiving the electromagnetic signals.

It should be appreciated that the present embodiment is not meant to limit the possible number of connection ports included in an interface of a multi-configuration network connection point device. While a preferred embodiment of the present invention includes a plurality of connection ports on one interface and a single connection port on the other to take advantage of singular communication path (e.g., cable run) to an upstream device, the present invention is readily adaptable to provide a variety of additional features (such as security, fault detection etc.) that are applicable to a plurality of connection ports on each interface.

Figure 2B:
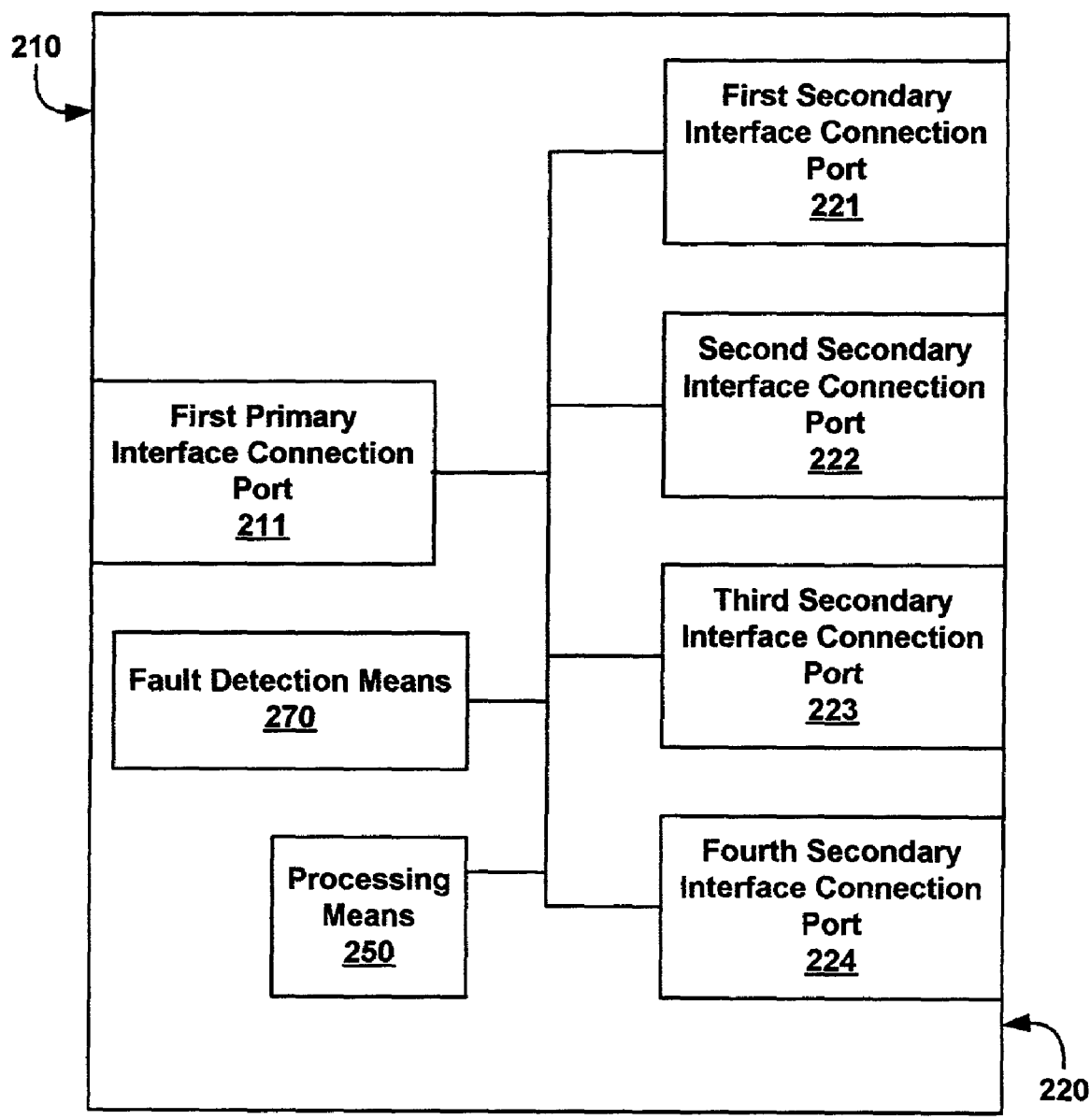
FIG. 2B is a block diagram of another embodiment of a present invention multi-configuration network connection point device.

FIG. 2B is a block diagram of multi-configuration network connection point device 200B, one embodiment of the present invention. In one embodiment of the present invention, multi-configuration network connection point device 200B intelligently concentrates and distributes communications between a plurality of interface connection ports and a single interface connection port. In one exemplary implementation, data communicated via multi-configuration network connection point device 200B is multiplexed and demultiplexed between a plurality of secondary connection interface ports and a single primary connection interface port. In one embodiment of the present invention, a multi-configuration network connection point device comprises intelligent connection determination means 250 for processing and interpreting data communicated via multi-configuration network connection point device 200B to determine appropriate connection configurations. In one exemplary implementation of the present invention, the intelligent connection determination means 250 includes a central processing unit (CPU) and a random access memory (RAM). The intelligent connection means processes and interprets data to provide a number of functions, including intelligent routing of data, security measures, maintenance and troubleshooting features, etc.

In one embodiment of the present invention a multi-configuration network connection point device includes a fault detection means 270 coupled to the intelligent connection determination means 250 for processing and interpreting data. It is appreciated that fault detection means 270 may be implemented in a variety of embodiments including but not limited to a hardware fault detector, a fault detection circuit, a software fault detector, a link beat signal fault detector, a ping signal fault detector, a loop-back mode for fault detection, etc. In one embodiment, fault detection means 270 (e.g., hardware, software, firmware, etc.) participates in fault detection operations in a communication network and is utilized to facilitate fault isolation in a network. In one embodiment, fault detection means 270 operates in conjunction with a head end component of a network in the performance of fault detection activities.

Figure 3:
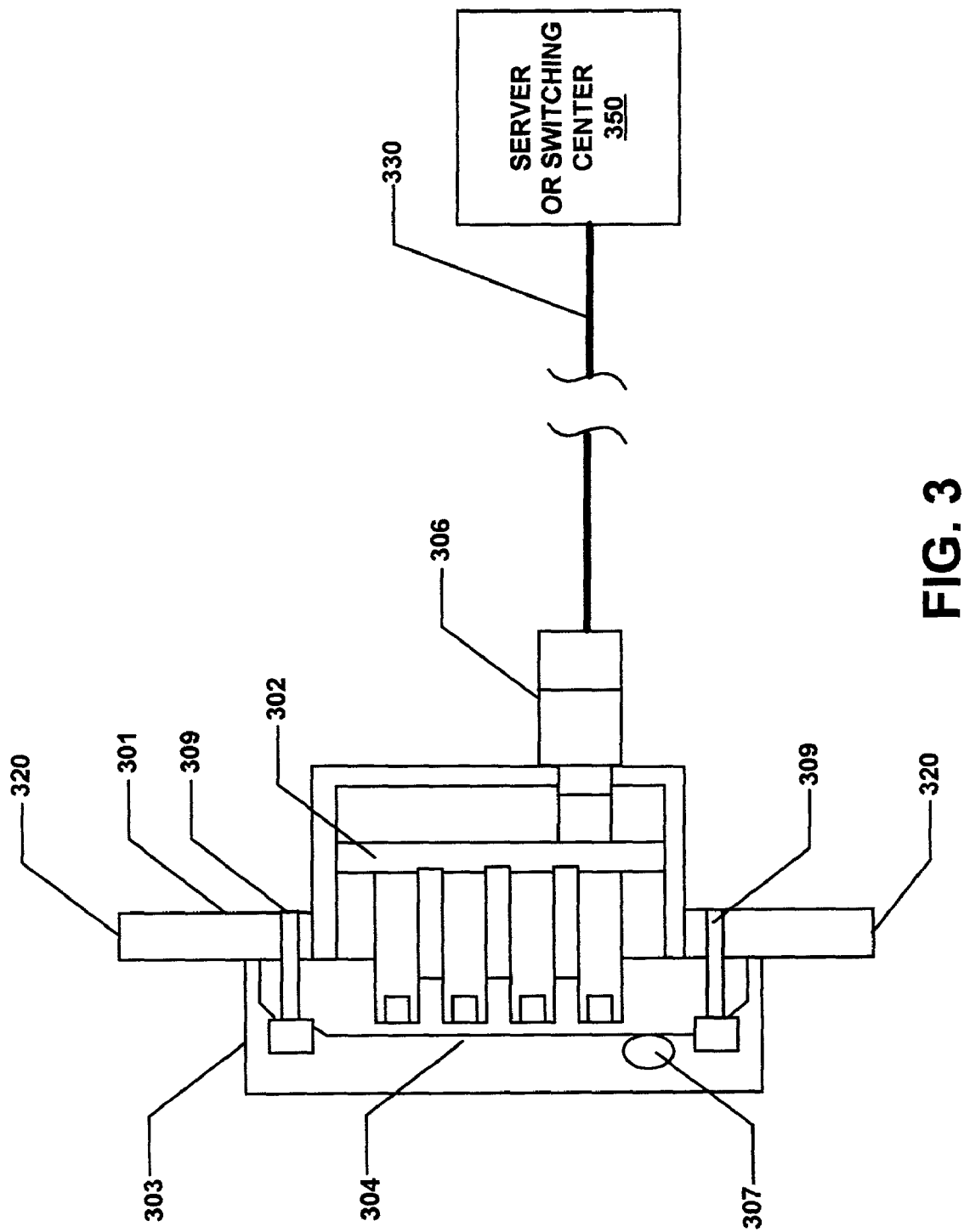
FIG. 3 is a block diagram of an intelligent concentrator, one implementation of a present invention multi-configuration network connection point device.

FIG. 3 is a block diagram of intelligent concentrator 301, one implementation of a present invention multi-configuration network connection point device. Intelligent concentrator 301 is shown in a side cutaway view, with secondary connection interface ports 304 (e.g., connection jacks) and wireless component 307 shown in one of several conceivable arrangements. Wireless communication component 307 is readily adaptable for implementation in a variety of protocols, including infrared or radio frequency (e.g., bluetooth) implementations. In one exemplary implementation of the present invention, multiplexing/demultiplexing of signals to and from a server is under the control of in-unit electronics 302. Again, communication signals and possible power travel over single cable 330 and connect to intelligent concentrator 301 via primary connection interface port connector 306. Anchoring means 309 fastens intelligent concentrator 301 to a stationary member (e.g., a wall, office cubicle section, floor, ceiling, etc.). Anchoring means 309 is readily adaptable to a variety of implementations including but not limited to, bolt, clamp, hook, latch, lock, lug nail, nut, pin, rivet, screw, etc. In one implementation of the present invention, anchoring means 309 is adapted to fasten intelligent concentrator 301 so portions of intelligent concentrator 301 behind anchoring plate 320 towards primary connection interface port connector 306 are recessed in a cavity of a stationary member.

Also shown in FIG. 3 is add-on device 303 that is coupled to intelligent concentrator 301. A range of possibilities exists for the functions of device 303. It could be implemented as an intelligent remote testing device, allowing the network infrastructure and cabling to be tested and evaluated from a central location, without any action being required at the work site. Device 303 might also be implemented as a security device, preventing physical attachment to the LAN cabling without a notification being sent to the server that the physical network port has been compromised. In one embodiment of the present invention, wireless component 307 in included in add-on device 303 and provides wireless communication capabilities to an embodiment of a present invention intelligent concentrators that does not have integrated wireless communication capabilities.

Figure 4:
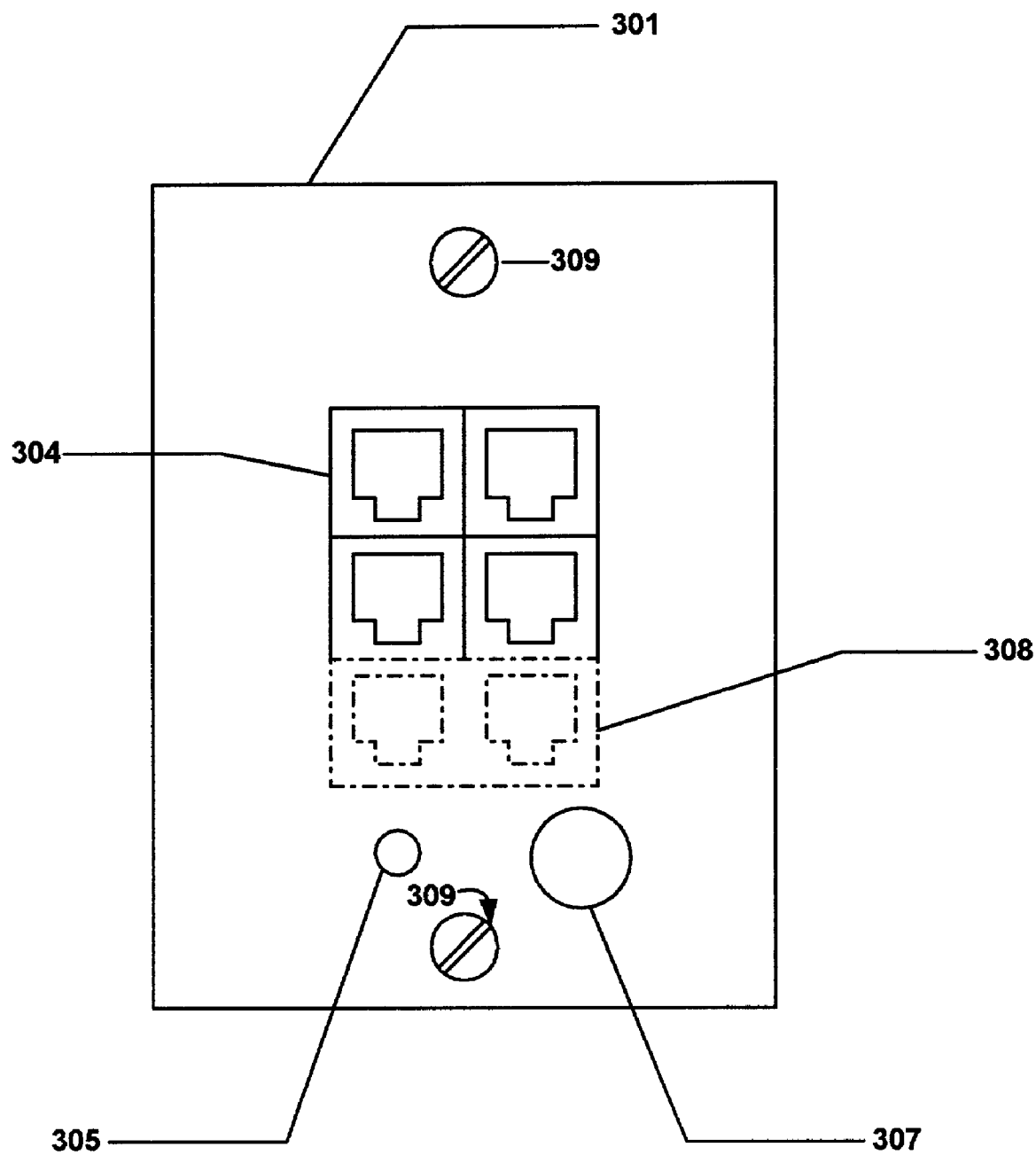
FIG. 4 illustrates a possible configuration for a secondary connection interface in one embodiment of the present invention.

FIG. 4 illustrates a possible configuration for a secondary connection interface in one embodiment of the present invention. Intelligent concentrator 301 is shown here with a secondary connection interface comprising four RJ-45 jacks 304. In one embodiment there is additional space for additional jacks 308, even when the configuration of intelligent concentrator 301 is adapted to covering a space similar to a standard wall plate device. In one embodiment of the present invention, a secondary connection interface includes a connection to a different network or to a telephone system. FIG. 4 also shows an embodiment of the present invention with a status indicator light 305 for providing a conveniently observable status indication.

Also shown in FIG. 4 is wireless communication component 307. Wireless communication component 307 could be implemented in any number of wireless standards for a communication connection without a fixed physical tether to other network devices. In one embodiment of the present invention, necessary transceiver electronics for device 307 are included within in the body of concentrator 301 (e.g., integral with internal electronics 302).

In one exemplary implementation of the present invention, wireless signals transmitted from a present invention multi-configuration network connection point device have a very short range. For example, a multi-configuration network connection point device transmits signals that are directed to a specific area (e.g., a work area) and/or are very low power communication signals that rapidly attenuate beyond a predetermined range (e.g., 10 feet). These short range transmissions are implemented in a manner that makes illicit interception from distant wireless devices (e.g., outside the location of a work area) very difficult. In one embodiment of the present invention, multi-configuration network connection point device is adapted to participate in encrypted communications, including requiring reception of an encrypted code before granting access to a communications network via the multi-configuration network connection point device. In one embodiment of the present invention, multi-configuration network connection point device imposes a vicinity test (e.g., a motion detector, finger print detector, sound detector, keypad detector, etc.) before being granted access to a communication network.

In one embodiment of the present invention, a multi-configuration network connection point device is adapted to receive power and forward it to downstream devices. In one exemplary implementation of the present invention, a multi-configuration network connection point device is adapted to receive power via a single primary interface port (e.g., 211) and forward it via a plurality of secondary interface ports (e.g., 221, 222, 223, and 224). In another exemplary implementation of the present invention, a multi-configuration network connection point device is adapted to receive and/or forward power via dedicated interface ports (e.g., coupled to a separate dedicated power cable). In one embodiment of the present invention, a multi-configuration network connection point device provides power management functions. In one exemplary implementation of the present invention, a multi-configuration network connection point device intelligent connection means controls on, off and low power modes. For example, a multi-configuration network connection point device switches between power modes based upon activity in a location (e.g., motion in a room), on the network (e.g., no data traffic communicated via the multi-configuration network connection point device for a period of time), time of day, etc.

The present invention facilitates power connections in a manner that assist isolating the effects of electrical faults (e.g., due to component failures or shorts in a connected devices or the wires leading to the connected device). For example, a multi-configuration network connection point device is configured to prevent external failures (e.g., faults, short circuit, etc.) from damaging or impacting the multi-configuration network connection point device itself, or other external components via the multi-configuration network connection point device. In one embodiment of the present invention, a multi-configuration network connection point device provides operational recovery at an affected port as soon as a failed external device or wire is unconnected (e.g., with current limiting fold back circuitry), self healing "poly switch" fuses). In one embodiment of the present invention, embedded intelligence (e.g.,. intelligent connection means 250) sense a failure or fault condition and issues a signal reporting the failure or fault (e.g., to a central management device).

Figure 5:
FIG. 5 is a flow chart of a multi-configuration network connection point method, one embodiment of the present invention.
Figure 5:

FIG. 5 is a flow chart of multi-configuration network connection point method 500, one embodiment of the present invention.

In step 510, a single connection point on a primary communication interface is provided. In one embodiment of the present invention the single connection point couples to a single communication path (e.g., to upstream network devices). In one embodiment of the present invention, the single connection point is configured for fixed placement in a concealed environment.

In step 520 a plurality of connection points on a secondary communication interface is provided. In one embodiment of the present invention the secondary communication interface is adapted to be secured in a fixed location while conveniently providing said communicatively coupling to a downstream network device via a wireless technology.

In step 530 the single connection point on a primary communication interface is coupled to the plurality of connection points on a secondary communication interface. In one embodiment of the present invention intelligently concentrating data from a plurality of interface connection ports included of said second connection interface for communication on said primary connection port of a first connection interface.

Thus, the present invention is a system and method that facilitates convenient connection to a communication network. A present invention multi-configuration network connection point device enables wireless devices to connect to a communication network. The "tamper" proof interface and recessed components of a multi-configuration network connection point device facilitates network maintenance and troubleshooting. The characteristics of the wireless communications and sensory capabilities of the multi-configuration network connection point device provide added security capabilities for network communications.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A multi-configuration network connection point device comprising:
   a first connection interface including a primary connection port for communicatively coupling to an upstream network device, said first connection interface coupled to a first surface of said multi-configuration network connection point device;
   a second connection interface including a secondary connection port for communicatively coupling to a downstream network device via a wireless technology, wherein said second connection interface is secured in a fixed location while conveniently providing said communicatively coupling to a downstream network device via a wireless technology, said second connection interface coupled to a second surface of said multi-configuration network connection point device; and
   a communication bus for communicatively coupling said first connection interface to said second connection interface; wherein
   said multi-configuration network connection point device further comprises an anchoring means for fastening said multi-configuration network connection point device to a stationary member so that portions behind said anchoring means towards said primary connection port are recessed in a cavity of said stationary member.

2. The multi-configuration network connection point device of claim 1 wherein said first connection interface comprises a single primary interface connection port for coupling with a singular communication path to an upstream device and said secondary connection interface comprises a plurality of interface connection ports.

3. The multi-configuration network connection point device of claim 1 further comprising dedicated interface ports for forwarding power.

4. The multi-configuration network connection point device of claim 1 further comprising a fault detection means for processing and interpreting data in fault detection and isolation operations.

5. The multi-configuration network connection point device of claim 1 wherein said secondary connection interface is configured for convenient placement in fixed locations in a manner that facilitates maintenance of system integrity and security.

6. A multi-configuration network connection point device comprising:
   a first connection interface, including a primary connection port for communicatively coupling to an upstream network device, configured to be fastened to a stationary member such that said first connection interface is recessed in a cavity of said stationary member;
   a second connection interface including a secondary connection port for communicatively coupling to a downstream network device via a wireless technology, wherein said second connection interface is adapted to be fastened to said stationary member while conveniently providing said communicatively coupling to a downstream network device via a wireless technology;
   a means for intelligently concentrating data from a plurality of interface connection ports included in said second connection interface for communication on said primary connection port of said first connection interface; and a communication bus for communicatively coupling said first connection interface to said second connection interface.

7. The multi-configuration network connection point device of claim 6 wherein said first connection interface comprises a single primary interface connection port.

8. The multi-configuration network connection point device of claim 6 wherein said secondary connection interface comprises a plurality of interface connection ports.

9. The multi-configuration network connection point device of claim 6 wherein said first connection interface couples to a singular communication path to an upstream device.

10. The multi-configuration network connection point device of claim 6 further comprising a means for processing and interpreting data coupled to a first interface.

11. The multi-configuration network connection point device of claim 10 further comprising a fault detection means coupled to the means for processing and interpreting data.

12. The multi-configuration network connection point device of claim 6 further comprising:

a processing unit for processing information; and a memory for storing said information.

13. A multi-configuration network connection point method comprising:

providing a single connection point on a primary communication interface;

providing a plurality of connection points on a secondary communication interface;

coupling the single connection point on a primary communication interface to the plurality of connection points on a secondary communication interface; and fastening the single connection point on a primary communication interface coupled to the plurality of connection points on a secondary communication interface to a stationary member so that the single connection point is recessed in a cavity of a stationary member.

14. The multi-configuration network connection point method of claim 13 wherein the single connection point couples to a single communication path to upstream network devices.

15. The multi-configuration network connection point method of claim 13 wherein the secondary communication interface is adapted to be secured in a fixed location while conveniently providing said communicatively coupling to a downstream network device via a wireless technology.

16. The multi-configuration network connection point method of claim 13 further comprising intelligently concentrating data from a plurality of interface connection ports included of said second connection interface for communication on said primary connection port of a first connection interface.

* * * * *